United States Patent
Coronado et al.

(10) Patent No.: US 7,996,643 B2
(45) Date of Patent: *Aug. 9, 2011

(54) SYNCHRONIZING LOGICAL SYSTEMS

(75) Inventors: Juan Alonso Coronado, Tucson, AZ (US); Bret Wayne Holley, Tucson, AZ (US); Marilyn Quinones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/163,468

(22) Filed: Jun. 27, 2008

(65) Prior Publication Data

US 2008/0263083 A1    Oct. 23, 2008

Related U.S. Application Data (63) Continuation of application No. 10/987,267, filed on Nov. 12, 2004, now Pat. No. 7,409,519.

(51) Int. Cl.
*G06F 12/08* (2006.01)
(52) U.S. Cl. ........................ 711/170; 711/203
(58) Field of Classification Search ............... None
See application file for complete search history.

(56) References Cited

U.S. PATENT DOCUMENTS

| | | | |
|---|---|---|---|
| 5,774,377 | A | 6/1998 | Eidson et al. |
| 6,636,518 | B1 | 10/2003 | Liencres |
| 6,976,134 | B1 | 12/2005 | Lolayekar et al. |
| 7,065,616 | B2 | 6/2006 | Gajjar et al. |
| 7,409,519 | B2 | 8/2008 | Coronado et al. |
| 2003/0007491 | A1 | 1/2003 | Read et al. |

OTHER PUBLICATIONS

First Office Action IFW dated Jul. 11, 2007, pp. 1-8, for U.S. Appl. No. 10/987,267, filed Nov. 12, 2004, by inventor J.A. Coronado et al.
Response IFW dated Oct. 11, 2007, pp. 1-15, to First Office Action IFW dated Jul. 11, 2007, for U.S. Appl. No. 10/987,267, filed Nov. 12, 2004, by inventor J.A. Coronado et al.
Final Office Action IFW dated Dec. 21, 2007, pp. 1-6, for U.S. Appl. No. 10/987,267, filed Nov. 12, 2004, by inventor J.A. Coronado et al.
Response IFW dated Feb. 21, 2008, pp. 1-13, to Final Office Action IFW dated Dec. 21, 2007, for U.S. Appl. No. 10/987,267, filed Nov. 12, 2004, by inventor J.A. Coronado et al.
Notice of Allowance IFW dated Mar. 27, 2008, pp. 1-6, for U.S. Appl. No. 10/987,267, filed Nov. 12, 2004, by inventor J.A. Coronado et al.

*Primary Examiner* — Gary J Portka
(74) *Attorney, Agent, or Firm* — Rabindranath Dutta; Konrad Raynes & Victor LLP (57) ABSTRACT

A storage control unit detects a change in a configuration of a plurality of logical subsystems included in the storage control unit. The storage control unit sends a notification, wherein the notification indicates the change in the configuration of the plurality of logical subsystems. The storage control unit receives data transfer requests directed at available logical subsystems in the storage control unit, wherein the available logical subsystems are determined based on the configuration of the plurality of logical subsystems.

15 Claims, 7 Drawing Sheets

SYNCHRONIZING LOGICAL SYSTEMS

CROSS-REFERENCE TO RELATED APPLICATIONS

This application is a continuation of application Ser. No. 10/987,267 filed on Nov. 12, 2004, which is incorporated herein by reference in its entirety.

BACKGROUND

1. Field

The disclosure relates to a method, system, and article of manufacture for synchronizing logical systems.

2. Background

In certain computing environments, a host computer may communicate with a storage control unit, where the storage control unit controls physical storage. The physical storage that is controlled by the storage control unit may be represented logically as a plurality of logical subsystems within the storage control unit.

Applications in the host computer may perform input/output (I/O) operations with respect to the logical subsystems of the storage control unit. For example, an application in the host computer may write to a logical subsystem of the storage control unit. The storage control unit may maintain a correspondence between the logical subsystems and storage media in the physical storage via logical and physical volumes. While data may be physically written to the storage media in the physical storage under the control of the storage control unit, as far as an application in the host computer is concerned, the application performs write operations with respect to the logical subsystems in the storage control unit.

Logical subsystems may be added, deleted, or otherwise modified within the storage control unit. Certain modifications to the logical subsystems of the storage control unit, such as a removal of a logical subsystem, may cause a failure of I/O operations that are sent from the host computer to the storage control unit.

SUMMARY OF THE DESCRIBED EMBODIMENTS

Provided are a method, system, and article of manufacture, wherein in certain embodiments a storage control unit detects a change in a configuration of a plurality of logical subsystems included in the storage control unit. The storage control unit sends a notification, wherein the notification indicates the change in the configuration of the plurality of logical subsystems. The storage control unit receives data transfer requests directed at available logical subsystems in the storage control unit, wherein the available logical subsystems are determined based on the configuration of the plurality of logical subsystems.

In certain additional embodiments, the notification is sent to at least one host computer, wherein the data transfer requests are I/O operations from the at least one host computer, and wherein the I/O operations are directed only at the available logical subsystems.

In further embodiments, a data structure is generated to keep track of the available logical subsystems in the storage control unit. A new logical subsystem is created in the storage control unit, wherein the creating of the new logical subsystem causes the change in the configuration of the plurality of logical subsystems. The data structure is updated to indicate that the new logical subsystem is available. An indication is made in the notification that the new logical subsystem is available. In additional embodiments, a host coupled to the storage control unit receives the notification. The host attempts to establish a previously rejected logical path for data transfer by using the new logical subsystem. A logical path is established for data transfer to the new logical subsystem.

In further embodiments, a data structure is generated to keep track of the available logical subsystems in the storage control unit. A logical subsystem is removed in the storage control unit, wherein the removing of the logical subsystem causes the change in the configuration of the plurality of logical subsystems. The data structure is updated to indicate that the removed logical subsystem is not available. An indication is made in the notification that the removed logical subsystem is not available. In additional embodiments, a host coupled to the storage control unit receives the notification. The host removes at least one logical path to the storage control unit, based on the notification.

In yet further embodiments, the storage control unit receives an establish logical path request to a logical subsystem of the plurality of logical subsystems. The storage control unit determines whether the logical subsystem is available. The storage control unit accepts the establish logical path request in response to determining that the logical subsystem is available. The storage control unit rejects the establish logical path request in response to determining that the logical subsystem is not available. In yet additional embodiments, the data transfer requests are generated in response to the accepting of the establish logical path request.

In further embodiments, the notification is a state change notification, and wherein information corresponding to the plurality of logical subsystems is synchronized between the storage control unit and at least one host coupled to the storage control unit based on the state change notification.

Provided also are methods for deploying computing infrastructure, comprising integrating computer-readable code into a computing system, wherein the code in combination with the computing system is capable of performing operations described in certain embodiments.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
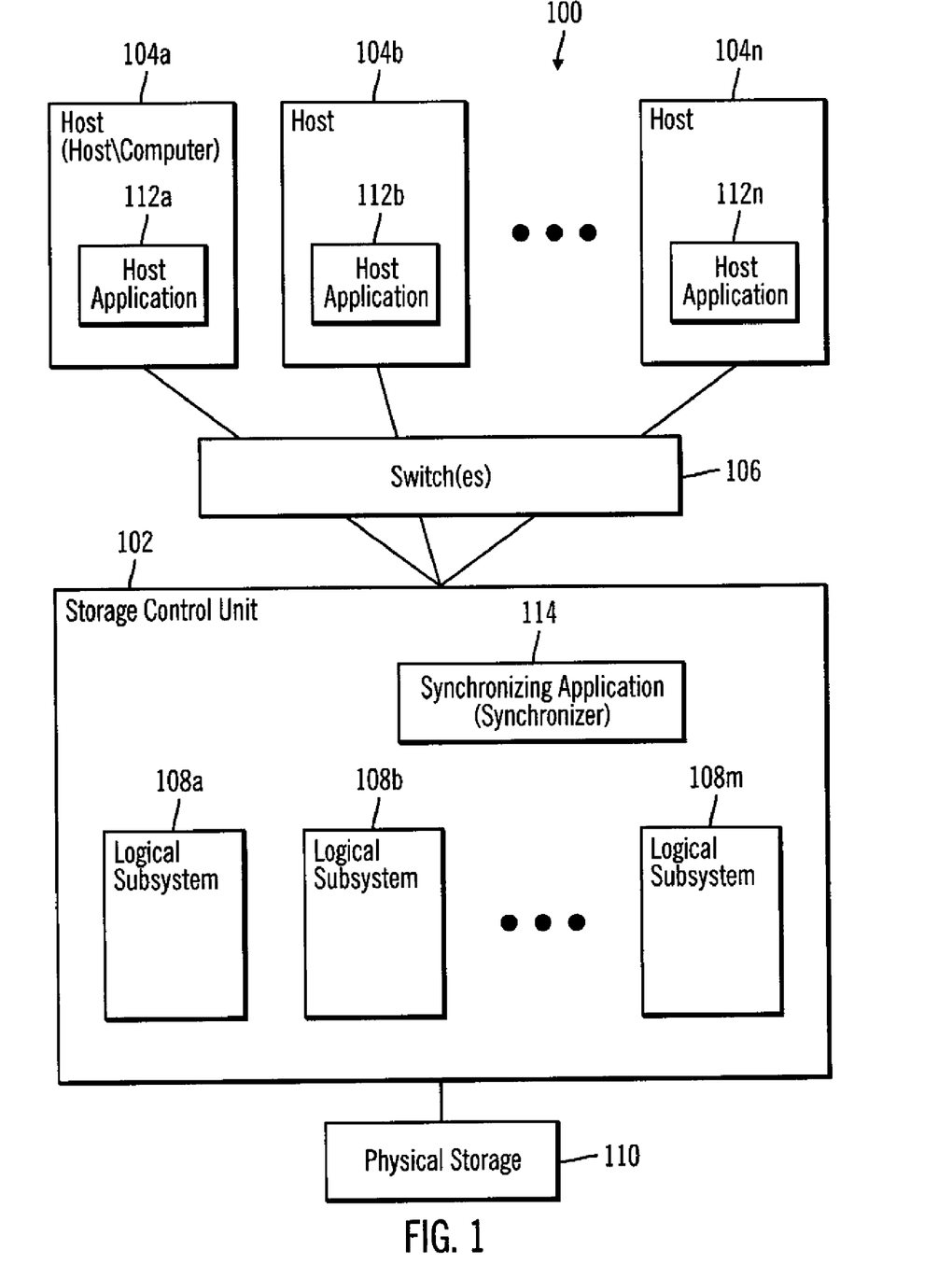
FIG. 1 illustrates a block diagram of a computing environment in accordance with certain embodiments.

FIG. 1 illustrates a block diagram of a computing environment 100 in accordance with certain embodiments. The computing environment 100 includes a storage control unit 102 that is coupled to a plurality of hosts 104a, 104b, . . . ,104n over one or more switches 106. The storage control unit 102 includes logical subsystems 108a, 108b, . . . ,108m that map to physical subsystems corresponding to a physical storage 110 that is controlled by the storage control unit 102. The plurality of hosts 104a . . . 104n include a plurality of host applications 112a, 112b, . . . , 112n that perform I/O operations with the logical subsystems 108a . . . 108m.

The plurality of hosts 104a . . . 104n may comprise any suitable computational device including those presently known in the art, such as, a personal computer, a workstation, a mainframe, a hand held computer, a palm top computer, a telephony device, a network appliance, a blade computer, a storage server, etc. The storage control unit 102 may include any suitable computational device that controls access to the physical storage 110. The physical storage 110 may include any suitable data storage including those presently known in the art, such as disk drives, tape drives, etc. In certain embodiments, the one or more switches 106 that couple the plurality of hosts 104a . . . 104n to the storage control unit 102 may comprise Enterprise Systems Connection (ESCON*) switches. For example, ESCON switches that use optical fiber technology may couple the hosts 104a . . . 104n comprising IBM S/390* or other computers to the storage control unit 102.

*IBM, ESCON, and S/390 are trademarks or registered trademarks of IBM corporation.

While FIG. 1 shows a single host application per host, in alternative embodiments a greater or a fewer number of host applications may execute in each host. Additionally, the number of host applications 112a . . . 112n that run of the plurality of hosts 104a . . . 104n may different from the number of hosts 104a . . . 104n.

A configuration of logical subsystems 108a . . . 108m in the storage control unit 102 may change because of additions, removals, or modifications to the logical subsystems 108a . . . 108m. For example, an exemplary host, such as the host 104a, may establish communication with an exemplary logical subsystem, such as the logical subsystem 108b. If the exemplary logical subsystem 108b is removed I/O operations from the host 104a to the exemplary logical subsystem 108b may fail. The logical subsystem 108a . . . 108m may comprise any plurality of logical storage systems, where each logical storage system includes at least one logical storage volume corresponding to one or more physical volumes stored in the physical storage 110.

In certain embodiments, when a configuration change of the logical subsystems 108a . . . 108m occurs within the storage control unit 102, the configuration change may be communicated to the hosts 104a . . . 104n by a synchronizing application 114 implemented in the storage control unit 102. The synchronizing application 114 is also referred to as a synchronizer and may be implemented in software, hardware, firmware or any combination thereof. As a result of the configuration change communicated by the synchronizer 114, the hosts 104a . . . 104n may refrain from performing I/O operations that will lead to a failure of access to a logical subsystem.

Therefore, FIG. 1 illustrates certain embodiments in which the synchronizer 114 of the storage control unit 102 communicates the configuration of the logical subsystems 108a . . . 108m to the hosts 104a . . . 104n. In certain embodiments, the hosts 104 . . . 104n take into consideration the configuration of the logical subsystems 108a . . . 108m before sending I/O commands to the storage control unit 102. In certain embodiments, I/O commands to an unavailable logical subsystem are not sent by the hosts 104a . . . 104n.

Figure 2:
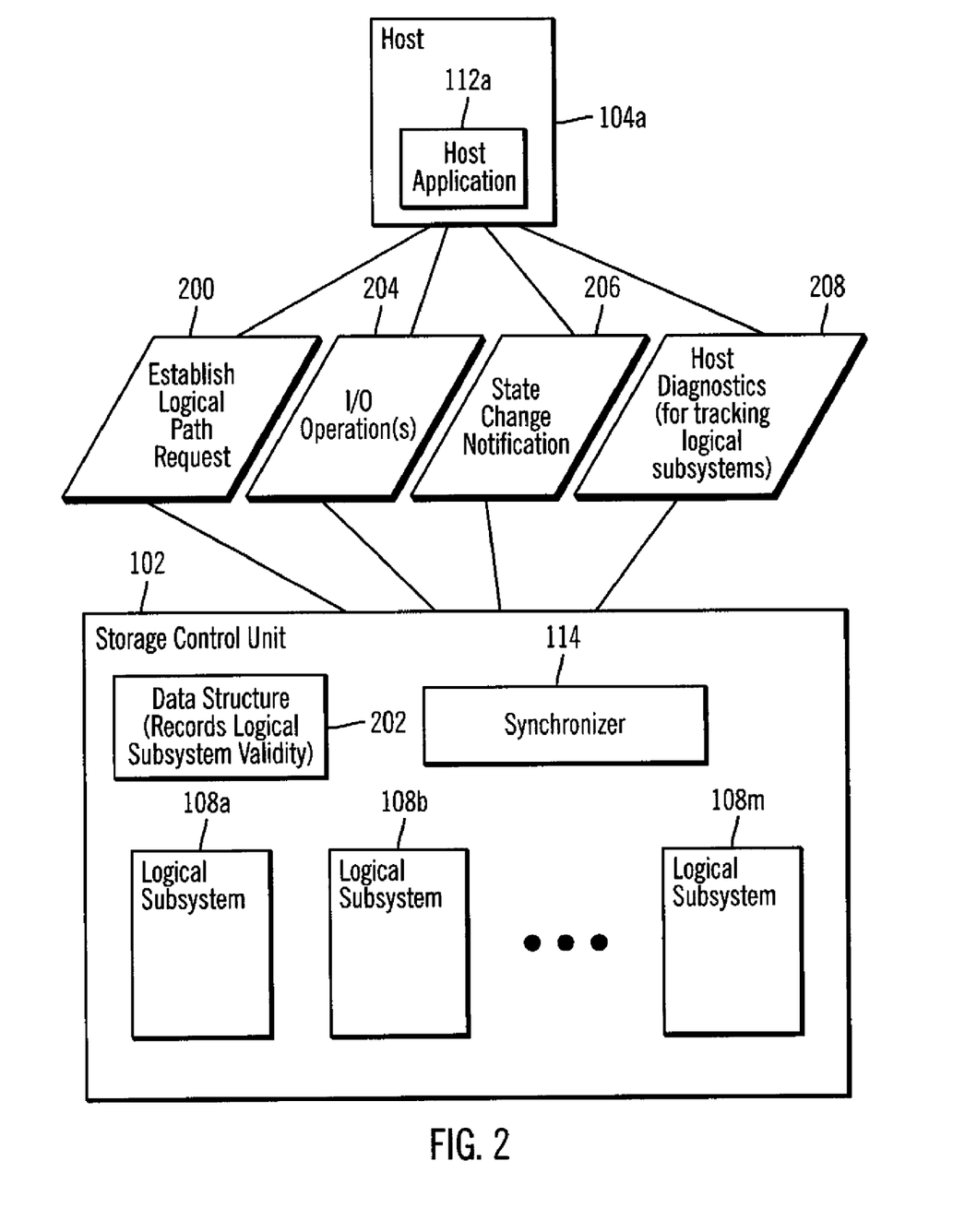
FIG. 2 illustrates a block diagram that shows how communications are performed in the computing environment, in a accordance with certain embodiments.

FIG. 2 illustrates a block diagram that shows how exemplary communications are performed in the computing environment 100, in accordance with certain embodiments.

An exemplary host 104a, selected from the hosts 104a . . . 104n, may include an exemplary host application 112a. The host application 112a may send an 'establish logical path' request 200 to the storage control unit 102, where the 'establish logical path' request 200 seeks to access a logical subsystem 108a . . . 108m of the storage control unit 102. The synchronizer 114 or some other application implemented in the storage control unit 102 may accept the logical path request 200 if the logical subsystem indicated by the 'establish logical path' request 200 is available. To determine the availability of the logical subsystem indicated by the 'establish logical path' request 200, the synchronizer may refer to information stored in a data structure 202 implemented in the storage control unit 102. The data structure 202 may record which of the logical subsystems 108a . . . 108m are available for access. In certain embodiments, the data structure 202 may comprise an array of pointers, where each pointer can reference a logical subsystem.

Once a logical path between the host application 112a and a logical subsystem has been established as a result of the successful completion of the 'establish logical path' request, the host application 112a may perform I/O operations 204 with respect to the logical subsystem with which the logical path was established.

In certain embodiments, the configuration of the logical subsystems 108a . . . 108m may change via additions, removals, or modifications to the logical subsystems 108a . . . 108m. For example, a new logical subsystem may be added or a logical subsystem may be removed. If a logical subsystem is removed, any I/O operations from the host application 112a to the removed logical subsystem may fail. To prevent such failures from occurring, in response to a change in the configuration of the logical subsystems 108a . . . 108m, the synchronizer 114 may send a state change notification 206 to the exemplary host 104a, and to other hosts 102b . . . 102n, where the state change notification 206 indicates the changed configuration of the logical subsystems 108a . . . 108m to the hosts 102a . . . 102n.

In certain embodiments, in response to receiving the state change notification 206 the host application 112a may perform diagnostics 208 on logical paths and logical subsystems 108a . . . 108m. For example, host diagnostics 208 may attempt to determine via a command to the storage control unit 102 which logical paths have been removed. The storage control unit 102 may send a response to the host application 112a, where the response indicates the logical paths that have been removed. The host application 112a may establish new logical paths or modify existing logical paths based on the results of the host diagnostics 208.

Therefore, FIG. 2 illustrates an embodiment in which the synchronizer 114 sends a stage change notification 206 to the hosts 104a . . . 104n indicating a change in the configuration of the logical subsystems 108a . . . 108m. Based on the received state change notification a host application, such as host application 112a, may perform I/O operations 204 with logical subsystems that are valid. As a result, I/O operations 204 are not performed with invalid, i.e., unavailable or non-operational, logical subsystems.

Figure 3:
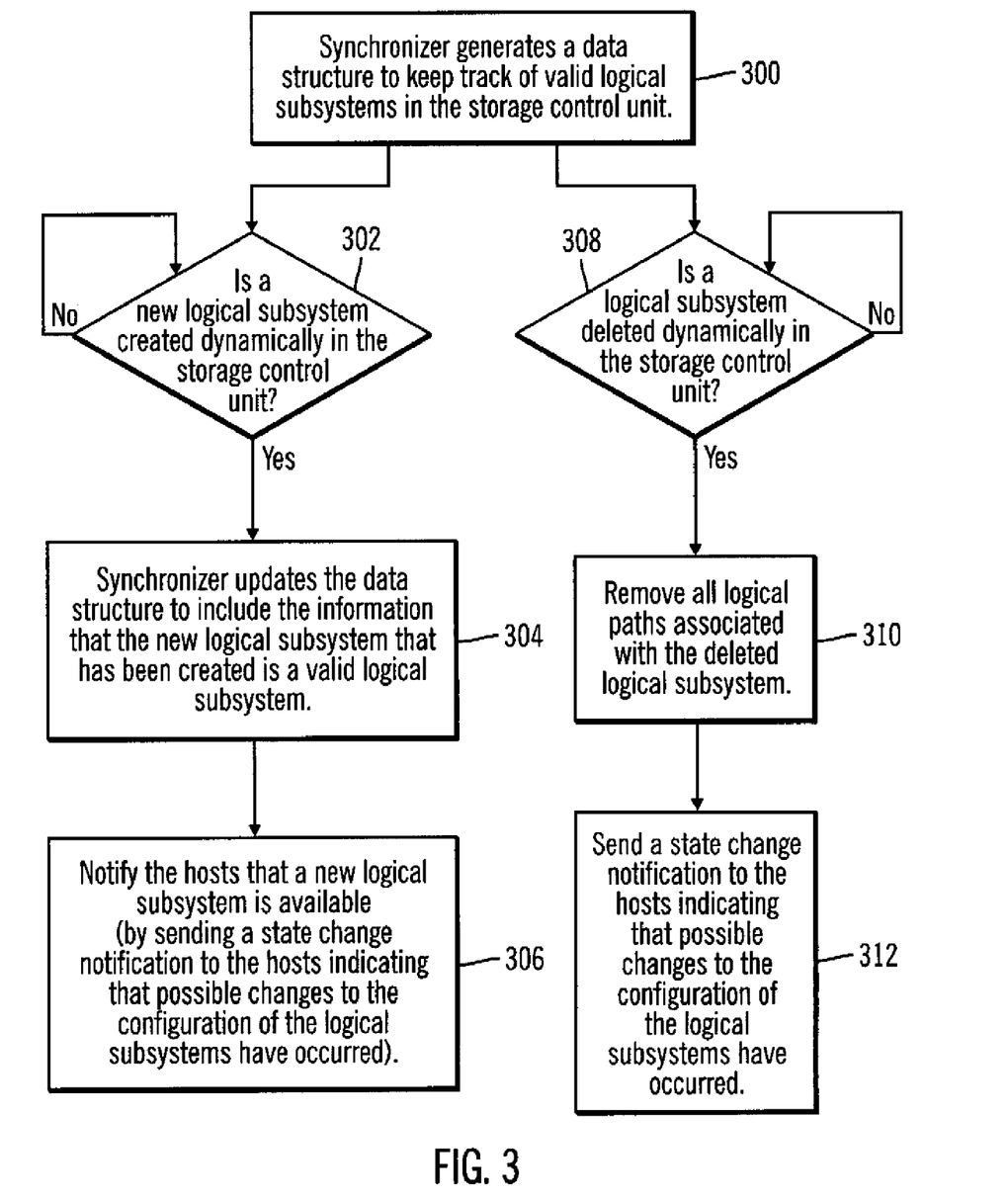
FIG. 3 illustrates operations performed by a synchronizer in a storage control unit in response to additions or deletions of logical subsystems, in accordance with certain embodiments.

FIG. 3 illustrates operations performed by the synchronizer 114 in the storage control unit 102 in response to additions or deletions of logical subsystems, in accordance with certain embodiments.

Control starts at block 300, where the synchronizer 114 generates a data structure 202 to keep track of valid logical subsystems in the storage control unit 102. For example, in certain embodiments the data structure 202 is an array of pointers with each pointer being capable of referencing a valid logical subsystem, where a logical subsystem is valid if the logical subsystem is available for use for performing I/O operations. From block 300, control can proceed in parallel to blocks 302 and 308.

The synchronizer 114 determines (at block 302) whether a new logical subsystem has been created dynamically in the storage control unit 102. Dynamic creation of a logical subsystem implies that a logical subsystem has been newly created and added to the logical subsystems 108a . . . 108m while the storage control unit 102 is operational. If the synchronizer 114 determines (at block 302) that no new logical subsystem has been created dynamically then the synchronizer 114 may wait and again determine (at block 302) whether a new logical subsystem has been created dynamically. In certain alternative embodiments, the synchronizer 114 may receive a notification from a newly created logical unit or some other application that a new logical unit has been created.

If the synchronizer 114 determines (at block 302) that a new logical subsystem has been created in the storage control unit 102, then the synchronizer 114 updates (at block 304) the data structure 202 to include the information that the new logical subsystem that has been created is a valid logical subsystem. The synchronizer 114 notifies (at block 306) the host applications 112a . . . 112n that a new logical subsystem is available. In certain embodiments, the notification is provided by sending a state change notification 206 to the host applications 112a . . . 112n. The state change notification 206 to the host applications 112a . . . 113n indicates that possible changes to the configuration of the logical subsystems 108a . . . 108m have occurred.

At block 308, the synchronizer 114 determines whether a logical subsystem has been deleted dynamically in the storage control unit 102. Dynamic deletion implies that a logical subsystem has been deleted from the logical subsystems 108a . . . 108m while the storage control unit 102 is operational. If the synchronizer 114 determines (at block 308) that no new logical subsystem has been deleted dynamically then the synchronizer 114 may wait and again determine (at block 308) whether a new logical subsystem has been deleted dynamically. In certain alternative embodiments, the synchronizer 114 may receive a notification from some other application in the storage control unit that a logical subsystem has been deleted dynamically.

If the synchronizer 114 determines (at block 308) that a logical subsystem has been deleted dynamically in the storage control unit 102, then the synchronizer 114 removes (at block 310) all logical paths associated with the deleted logical subsystem. For example, if a logical path was being used for I/O operations with the deleted logical unit, then the logical path is removed, i.e., the logical path cannot be used any further.

The synchronizer 114 sends (at block 312) a state change notification 206 to the host applications 112a . . . 112n, where the state change notification 206 indicates to the host applications 112a . . . 112n that a change in the configuration of the logical subsystems 108a . . . 108m has occurred.

Therefore, FIG. 3 illustrates certain embodiments in which the synchronizer 114 sends a state change notification 206 to the hosts 104a . . . 104n, in response to an addition or deletion of a logical subsystem that changes the configuration of the logical subsystems 108a . . . 108m.

Figure 4:
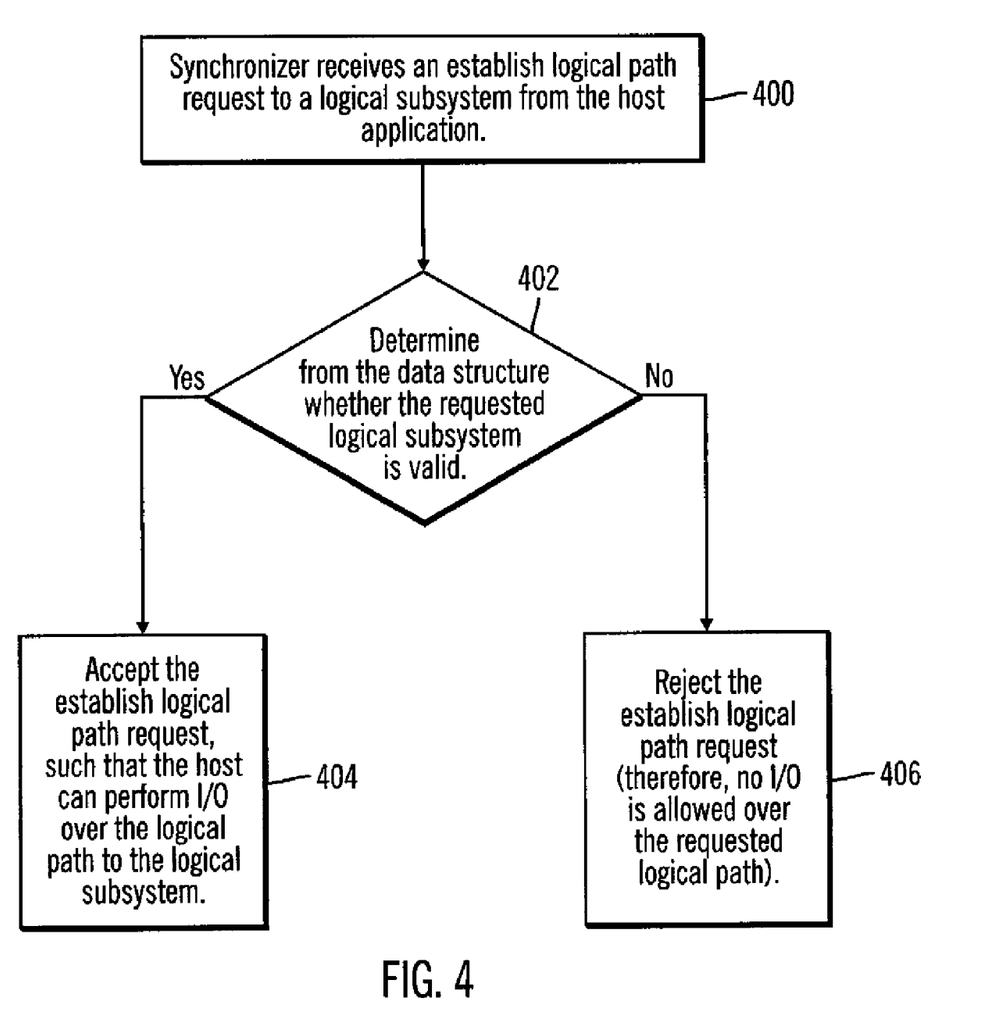
FIG. 4 illustrates operations performed by the synchronizer in the storage control unit in response to logical path requests received from the host, in accordance with certain embodiments.

FIG. 4 illustrates operations performed by the synchronizer 114 in the storage control unit 102, in response to 'establish logical path' requests 200 received from the hosts 104a . . . 104n, in accordance with certain embodiments.

Control starts at block 400 where the synchronizer 114 receives an 'establish logical path' request 200 to a logical subsystem from a host application, such as host application 112a.

The synchronizer 114 determines (at block 402) from the data structure 202 whether the logical subsystem to which a logical path is requested via the 'establish logical path' request 200 is valid. If so, the synchronizer 114 accepts (at block 404) the 'establish logical path' request 200, such that the host application 112a can perform I/O operations over the established logical path to the logical subsystem.

If the synchronizer 114 determines (at block 402) from the data structure 202 that the logical subsystem to which a logical path is requested via the 'establish logical path' request 200 is invalid, then the synchronizer 114 rejects (at block 406) the 'establish logical path' request 200. Therefore, no I/O operations are allowed to the logical subsystem to which the logical path is requested.

Therefore, FIG. 4 illustrates certain embodiments in which in response to an 'establish logical path' request 200 to a logical subsystem from a host, such as host 104a, the synchronizer 114 allows a logical path to be established if the logical subsystem is valid, and does not allow a logical path to be established if the logical subsystem in not valid. By not allowing a logical path to be established if the logical subsystem is not valid, the synchronizer 114 allows the hosts 104a . . . 104n to avoid generating I/O operations directed to an unavailable logical unit.

Figure 5:
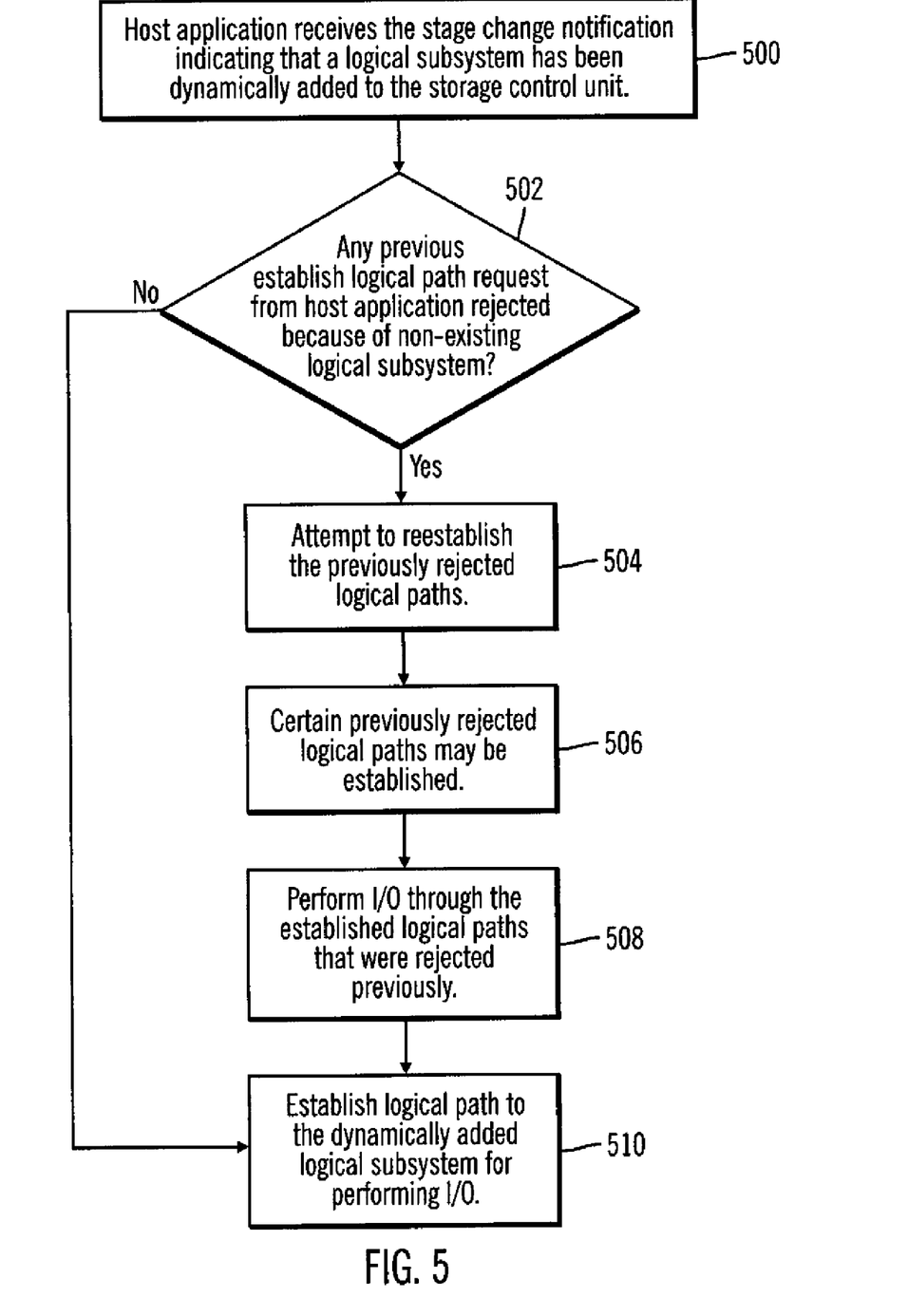
FIG. 5 illustrates operations performed by a host application in response to receiving a state change notification indicating that a logical subsystem has been added, in accordance with certain embodiments.

FIG. 5 illustrates operations performed by a host application 112a . . . 112n in response to receiving a state change notification 206 indicating that a logical subsystem has been added to the storage control unit 102, in accordance with certain embodiments.

Control starts at block 500, where a host application, such as host application 112a implemented in the host 104, receives the stage change notification 206 indicating that a logical subsystem has been dynamically added to the storage control unit 102. The state change notification 206 indicating that a logical subsystem has been dynamically added to the storage control unit 102 may have been generated in block 306 of FIG. 3 by the synchronizer 114.

The host application 112a determines (at block 502) whether any previous 'establish logical path' request from the host application 112a has been rejected because a logical subsystem was not available in the storage control unit 102 for the establishment of the previously requested logical path. If so, the host application 112a attempts (at block 504) to establish the previously rejected logical path(s) once gain. Certain previously rejected logical paths may be established (at block 506) and the host application 112a performs (at block 508) I/O operations through the established logical paths. The host application 112 may establish (at block 510) a logical path to the dynamically added logical subsystem to perform I/O operations with the dynamically added logical subsystem.

If the host application 112a determines (at block 502) that no previous 'establish logical path' requests were rejected because of the unavailability of logical subsystems, then the host application 112a establishes (at block 510) a logical path to the dynamically added logical subsystem to perform I/O operations.

Therefore, FIG. 5 illustrates certain embodiments in which a host application attempts to establish previously rejected logical paths in response to receiving a state change notification that indicates that a logical subsystem has been dynamically added to the storage control unit 102. Additionally, the host application may also establish a logical path to perform I/O operations with respect to the dynamically added logical subsystem.

Figure 6:
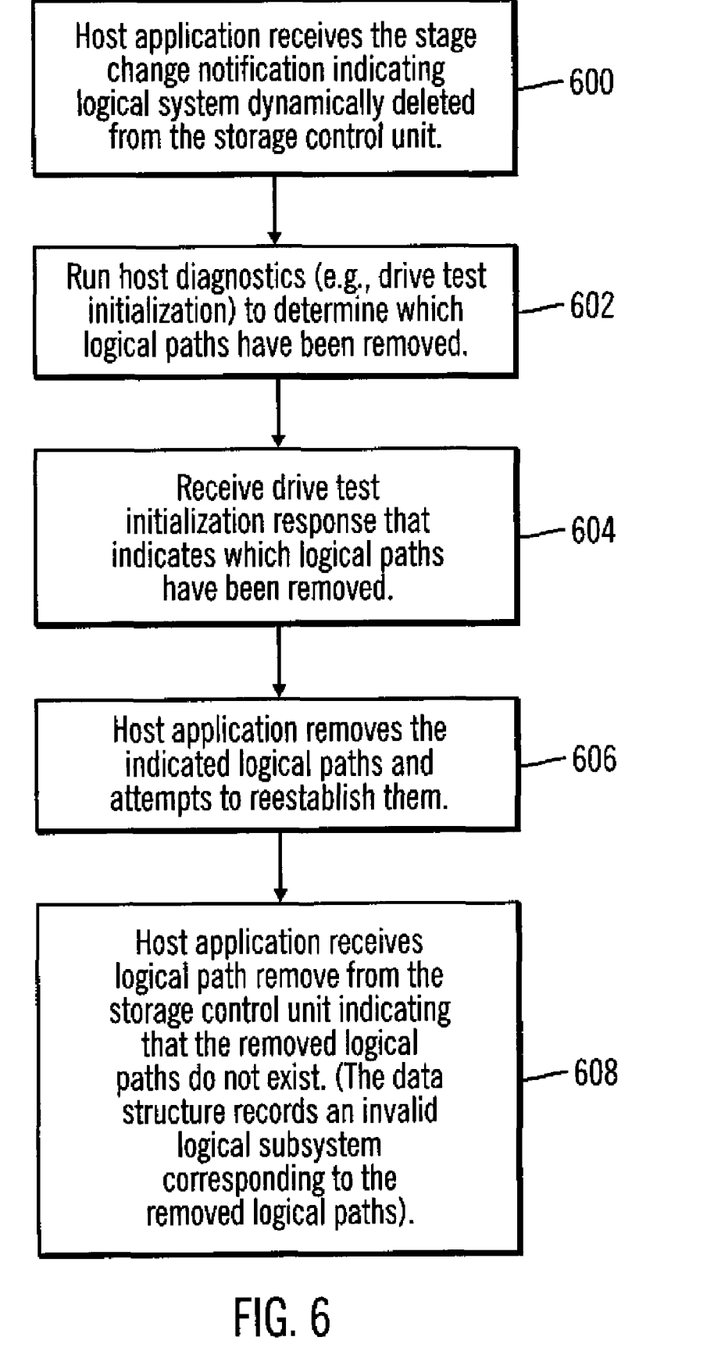
FIG. 6 illustrates operations performed by a host application in response to receiving a state change notification indicating that a logical subsystem has been deleted, in accordance with certain embodiments.

FIG. 6 illustrates operations performed by a host application 112a . . . 112n in response to receiving a state change notification 206 indicating that a logical subsystem has been deleted in the storage control unit 102, in accordance with certain embodiments.

Control starts at block 600, where a host application, such as the host application 112a, receives a stage change notification 206 indicating that a logical subsystem has been dynamically deleted from the storage control unit 102. In certain embodiments, the state change notification 206 indicating that a logical subsystem has been dynamically deleted from the storage control unit 102 may be received by the host application 112a as a result of the operation performed in block 312 of FIG. 3, where the synchronizer 114 sends the state change notification 206 to the host applications 112a . . . 112n on the hosts 104a . . . 104n.

The host application 112a runs (at block 602) host diagnostics 208 to determine which logical paths have been removed. To perform the host diagnostics 208 the host application 112a may send a drive test initialization command that tests the logical subsystems 108a . . . 108m to determine which logical paths have been removed.

In response to the drive test initialization command, the host application 112a may receive (at block 604) a drive test initialization response from the storage control unit 102, where the response indicates which logical paths have been removed. The host application 112a removes (at block 606) the indicated logical paths and may attempt to establish the logical paths once gain. The host application 112a also receives (at block 608) a 'logical path remove' command from the storage control unit 102, where the 'logical path remove' command indicates that the removed logical paths do not exist. The data structure 202 records an invalid logical subsystem corresponding to the removed logical paths.

Therefore, FIG. 6 illustrates certain embodiments in which a host application runs diagnostics 208 for tracking dynamically removed logical subsystems in the storage control unit 102, in response to receiving a state change notification 206 that indicates a deletion of logical systems in the storage control unit 102.

In certain embodiments, the storage control unit 102 sends a state change notification 206 to the plurality of hosts 104a . . . 104n in response to a change in configuration of the logical subsystems 108a . . . 108m. Certain embodiments provide a mechanism to detect a mismatch between the configuration of logical subsystems in a storage control unit and the expected configuration of the logical subsystems in a host by examining the state change notification 206. In certain embodiments, 'establish logical path' requests that are made to unavailable logical subsystems are rejected and hosts are prevented from performing I/O operations to logical subsystems that are unavailable. Avoiding I/O operations to unavailable logical subsystems may improve the performance of the hosts 104a . . . 104n and the storage control unit 102, in comparison to the situation where I/O operations are attempted to unavailable logical subsystems and lead to failed I/O operations. Certain embodiments allow information related to the configuration of the logical subsystems 108a . . . 108m to be synchronized between the hosts 104a . . . 104n and the storage control unit 102.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), ASIC, etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 7:
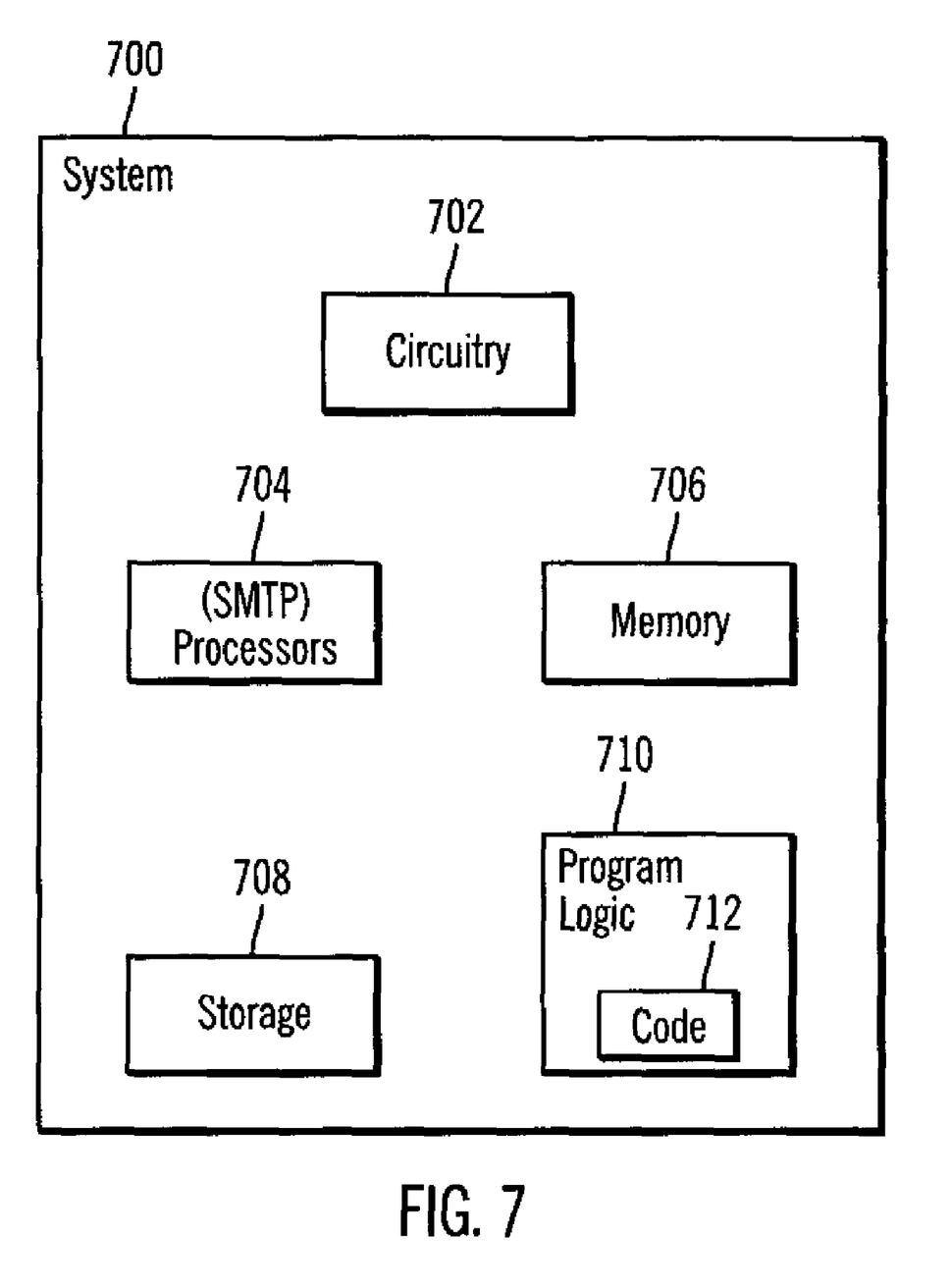
FIG. 7 illustrates a system in which certain embodiments are implemented, in accordance with certain embodiments.

FIG. 7 illustrates a block diagram of a system 700 in which certain embodiments may be implemented. In certain embodiments, the storage control unit 102 and the hosts 104a . . . 104n may be implemented in accordance with the system 700. The system 700 may include a circuitry 702 that may in certain embodiments include a processor 704. The system 700 may also include a memory 706 (e.g., a volatile memory device), and storage 708. Certain elements of the system 700 may or may not be found in the storage control unit 102 or the hosts 104a . . . 104n. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments. In certain embodiments different storage systems may be used in the computing environment, such as Redundant Array of Independent Disks (RAID), Just a bunch of disks (JBOD), Direct Access Storage Device (DASD), tape, etc.

At least certain of the operations of FIGS. 3-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system in communication with a host computer, comprising:
   memory; and
   processor coupled to the memory, wherein the processor is configured to perform operations, the operations comprising:
   (i) detecting a change in a configuration of a plurality of logical subsystems;
   (ii) sending a notification, wherein the notification indicates the change in the configuration of the plurality of logical subsystems; and
   (iii) receiving data transfer requests directed at available logical subsystems, wherein the available logical subsystems are determined based on the configuration of the plurality of logical subsystems, wherein the system is a storage control unit, and wherein the operations further comprise:
   (a) generating a data structure to keep track of the available logical subsystems in the storage control unit;
   (b) creating a new logical subsystem in the storage control unit, wherein the creating of the new logical subsystem causes the change in the configuration of the plurality of logical subsystems;
   (c) updating the data structure to indicate that the new logical subsystem is available; and
   (d) indicating in the notification that the new logical subsystem is available, wherein the host computer receives the notification, wherein the host computer attempts to establish a previously rejected logical path for data transfer by using the new logical subsystem, and wherein the host computer establishes a logical path for data transfer to the new logical subsystem.

2. An article of manufacture, wherein a storage control unit includes a plurality of logical subsystems, and wherein code stored in the article of manufacture when executed by a processor causes operations, the operations comprising:
   detecting, in the storage control unit, a change in a configuration of the plurality of logical subsystems included in the storage control unit;
   sending, by the storage control unit, a notification, wherein the notification indicates the change in the configuration of the plurality of logical subsystems; and
   receiving, by the storage control unit, data transfer requests directed at available logical subsystems in the storage control unit, wherein the available logical subsystems are determined based on the configuration of the plurality of logical subsystems, the operations further comprising:
   (i) generating a data structure to keep track of the available logical subsystems in the storage control unit;
   (ii) creating a new logical subsystem in the storage control unit, wherein the creating of the new logical subsystem causes the change in the configuration of the plurality of logical subsystems;
   (iii) updating the data structure to indicate that the new logical subsystem is available; and
   (iv) indicating in the notification that the new logical subsystem is available, the operations further comprising: (a) receiving, at a host computer coupled to the storage control unit, the notification; (b) attempting, by the host computer,
   to establish a previously rejected logical path for data transfer by using the new logical subsystem; and (c) establishing a logical path for data transfer to the new logical subsystem.

3. The article of manufacture of claim 2, wherein the notification is sent to at least one host computer, wherein the data transfer requests are Input/Output (I/O) operations from the at least one host computer, and wherein the I/O operations are directed only at the available logical subsystems.

4. A system, comprising:
   memory; and
   processor coupled to the memory, wherein the processor is configured to perform operations, the operations comprising:
   (i) creating a new logical subsystem in a storage control unit, wherein the creating of the new logical subsystem causes a change in a configuration of a plurality of logical subsystems included in the storage control unit;
   (ii) sending, by the storage control unit, a notification to a host computer coupled to the storage control unit, wherein the notification indicates the change in the configuration of the plurality of logical subsystems, and wherein the notification indicates that the new logical subsystem is available;
   (iii) receiving, at the host computer coupled to the storage control unit, the notification;
   (iv) attempting, by the host computer, to establish a previously rejected logical path for data transfer to the storage control unit by using the new logical subsystem; and
   (v) establishing a logical path for data transfer to the new logical subsystem included in the storage control unit from the host computer.

5. The system of claim 4, wherein the system is a storage control unit, and wherein the operations further comprise:
   generating a data structure to keep track of the available logical subsystems in the storage control unit;

removing a logical subsystem in the storage control unit, wherein the removing of the logical subsystem causes the change in the configuration of the plurality of logical subsystems;

updating the data structure to indicate that the removed logical subsystem is not available; and indicating in the notification that the removed logical subsystem is not available.

6. The system of claim 5, wherein the host computer removes at least one logical path to the storage control unit, based on the notification.

7. The system of claim 4, wherein the system is a storage control unit, and wherein the operations further comprise:

receiving, by the storage control unit, an establish logical path request to a logical subsystem of the plurality of logical subsystems;

determining, by the storage control unit, whether the logical subsystem is available;

accepting the establish logical path request in response to determining that the logical subsystem is available; and rejecting the establish logical path request in response to determining that the logical subsystem is not available.

8. The system of claim 7, wherein data transfer requests are generated in response to the accepting of the establish logical path request.

9. The system of claim 4, wherein the notification is a state change notification, and wherein information corresponding to the plurality of logical subsystems is synchronized between the storage control unit and the host computer in communication with the storage control unit based on the state change notification.

10. An article of manufacture, wherein a storage control unit includes a plurality of logical subsystems, and wherein code stored in the article of manufacture when executed by a processor causes operations, the operations comprising:

creating a new logical subsystem in the storage control unit, wherein the creating of the new logical subsystem causes a change in a configuration of the plurality of logical subsystems included in the storage control unit;

sending, by the storage control unit, a notification to a host computer coupled to the storage control unit, wherein the notification indicates the change in the configuration of the plurality of logical subsystems, and wherein the notification indicates that the new logical subsystem is available;

receiving, at the host computer coupled to the storage control unit, the notification;

attempting, by the host computer, to establish a previously rejected logical path for data transfer to the storage control unit by using the new logical subsystem; and establishing a logical path for data transfer to the new logical subsystem included in the storage control unit from the host computer.

11. The article of manufacture of claim 10, the operations further comprising:

generating a data structure to keep track of the available logical subsystems in the storage control unit;

removing a logical subsystem in the storage control unit, wherein the removing of the logical subsystem causes the change in the configuration of the plurality of logical subsystems;

updating the data structure to indicate that the removed logical subsystem is not available; and indicating in the notification that the removed logical subsystem is not available.

12. The article of manufacture of claim 11, the operations further comprising:

removing, by the host computer, at least one logical path to the storage control unit, based on the notification.

13. The article of manufacture of claim 10, the operations further comprising:

receiving, by the storage control unit, an establish logical path request to a logical subsystem of the plurality of logical subsystems;

determining, by the storage control unit, whether the logical subsystem is available;

accepting the establish logical path request in response to determining that the logical subsystem is available; and rejecting the establish logical path request in response to determining that the logical subsystem is not available.

14. The article of manufacture of claim 13, wherein data transfer requests are generated in response to the accepting of the establish logical path request.

15. The article of manufacture of claim 10, wherein the notification is a state change notification, and wherein information corresponding to the plurality of logical subsystems is synchronized between the storage control unit and at least one host computer coupled to the storage control unit based on the state change notification.

* * * * *